US 6,658,011 B1

(12) United States Patent
Sevanto et al.

(10) Patent No.: US 6,658,011 B1
(45) Date of Patent: Dec. 2, 2003

(54) USE OF WIRELESS APPLICATION PROTOCOL IN A PACKET-SWITCHED RADIO TELECOMMUNICATION SYSTEM

(75) Inventors: Jarkko Sevanto, Helsinki (FI); Mohan Sivanandan, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/551,703

(22) Filed: Apr. 18, 2000

(30) Foreign Application Priority Data

Apr. 19, 1999 (FI) .................................................. 990878

(51) Int. Cl.[7] .............................. H04L 12/28; H04J 3/16
(52) U.S. Cl. ....................... 370/401; 370/469; 709/230
(58) Field of Search ................................ 370/230, 231, 370/310, 328, 338, 401, 466, 469, 470, 472; 455/517; 709/227, 228, 230; 707/513

(56) References Cited

FOREIGN PATENT DOCUMENTS

CA          2270649         4/2000

OTHER PUBLICATIONS

Wireless Application Protocol Architecture Specification, WAP Architecture, Version 30, 1998, pp. 1–20.

*Primary Examiner*—Huy D. Vu
*Assistant Examiner*—Duc Ho
(74) *Attorney, Agent, or Firm*—Perman & Green, LLP

(57) ABSTRACT

A method is provided for transmitting information related to the use of the Wireless Application Protocol between a first device and a second device coupled to a packet-switched data transmission network. A first protocol stack (201, 202, 203, 204, 205, 206, 207) is defined for the first device and a second protocol stack (251, 252, 253, 254, 255, 256; 511, 512, 513, 514, 515, 516) is defined for the second device. The protocol stacks consist of layers and serve the arranging of the mutual exchange of information between the first device and the second device. An octet stream protocol layer (206, 255) is defined for the transmission of unstructured octet streams as a certain layer in the first protocol stack and a certain layer in the second protocol stack. A Wireless Datagram Protocol layer (207, 256) is also defined as a certain layer above the octet stream protocol layer (206, 255) in the first and second protocol stacks. Information related to the use of the Wireless Application Protocol is exchanged between the Wireless Datagram Protocol layer (207) in the first device and the Wireless Datagram Protocol layer (256) in the second device through the use of the octet stream protocol layer (206, 255) as well as other lower layers in the first and second protocol stacks.

9 Claims, 5 Drawing Sheets

_US 6,658,011 B1_

USE OF WIRELESS APPLICATION PROTOCOL IN A PACKET-SWITCHED RADIO TELECOMMUNICATION SYSTEM

TECHNOLOGICAL FIELD

The invention concerns generally the use of certain protocols and services for conveying certain types of information between the different nodes of a telecommunication network. Especially the invention concerns the use of such protocols and services to facilitate the use of the Wireless Application Protocol between a terminal of a cellular radio network and a node computer of a fixed packet-switched network.

BACKGROUND OF THE INVENTION

The Wireless Application Protocol (WAP) is a result of the efforts of an internationally acknowledged instance known as the WAP Forum to promote industry-wide specifications for technology used for developing applications and services that operate over wireless networks, such as GSM (Global System for Mobile telecommunications). WAP specifies an application framework and a set of network protocols for wireless devices such as mobile telephones and personal digital assistants (PDAs). The lowest layer of the WAP protocol stack is the WDP (Wireless Datagram Protocol) layer. The WDP layer should operate above a bearer service supported by a wireless network and capable of conveying data transmissions. In the existing GSM networks WAP is usually implemented using the Short Message Service or SMS as the bearer below the WDP layer, but in such arrangements the limitations inherent to the SMS are seriously restricting the applicability of the WAP.

Novel radio telecommunication systems with inherent packet-switched communication capabilities and/or connections to fixed packet-switched networks are currently being specified. As an example we will consider the system of FIG. 1, where a terminal 101 is a UMTS (Universal Mobile Telecommunications System) terminal operating in a UMTS network 103 and terminal 102 is an enhanced GSM terminal operating in an enhanced GSM network 104. From both networks there is a connection to a GPRS (General Packet Radio Service) network 105. The UMTS network 103 comprises a UTRAN or UMTS Terrestrial Radio Access Network 106 as well as a CN or Core Network 107. In the enhanced GSM network 104 a BSS or Base Station Subsystem 108 and an MSC or a Mobile Switching Centre 109 are shown. The detailed structure of the network elements is unessential to the present invention, but it is known that for example a UTRAN consists of a number of Radio Network Subsystems, each of which in turn comprises a Radio Network Controller and a number of Node Bs roughly corresponding to base stations. A BSS in turn comprises a Base Station Controller and a number of Base Transceiver Stations operating under it. Various mixed-mode cellular telephone systems are possible; for example the BSS 108 might operate under the same CN as the UTRAN 106. The terminals could also be exactly similar terminals operating close to each other in a single cell.

In FIG. 1 there is a connection both from the UTRAN 106 and from the BSS 108 to a corresponding SGSN or Serving GPRS Support Node 110 and 111. Both of these are in turn coupled, through the GPRS trunk lines, to a GGSN or Gateway GPRS Support Node 112 from which there is a further connection to WAP gateway 113. The WAP gateway may also be known as a WAP proxy, and it could also be realised as a part of the GGSN 112; in FIG. 1 it is independent of the GGSN and not even a part of the GPRS network but connected to it through the Internet 114. If the above-mentioned SMS arrangement were used as the bearing service between a terminal 101 or 102 and the WAP gateway 113, there should also be a SMSC or Short Message Switching Centre coupled to the CN 107 and the MSC 109, and the direct connections from the UTRAN 106 and the BSS 108 to the GPRS network could not be utilized. However, it has been proposed that the routing shown in FIG. 1 should in the future be used for all data traffic between the terminals and the fixed packet-switched networks.

At the time of filing this patent application there does not exist an unambiguously defined way of using the lower-level protocol layers and PDP Contexts (Packet Data Protocol) in the terminals and fixed network devices to convey the messages related to the use of the WAP. It is clear that somewhere at a relatively high level in the protocol stacks of both the terminals 101 and 102 and the WAP-GW 113 there must be a WDP entity that uses the services offered by the lower level protocols to convey the WAP-related messages. Additionally those messages must be mapped into PDP Contexts of certain type; the mapping will be closely related to the choice of lower protocol layers under the WDP entity. We anticipate that network operators will require the WAP usage to be distinguishable from other forms of packet-switched data transmission in order to arrange for a suitable charging scheme for the WAP-related services.

A proposed prior art approach for conveying WAP-related messages is to build the WAP-related messaging on top of the known IP or Internet Protocol PDP Type. This would require the GGSNs to reserve and allocate dynamic IP addresses to mobile users. The use of dynamic addresses is not efficiently combined to WAP services, and in any case using the IP PDP Type for WAP messaging would consume the scarce IP addresses and involve the whole complexity of allocating and maintaining IP addresses and dynamically configuring hosts. A terminal roaming in another network should in practice always use the WAP-GW of its home network, because there is no possibility of dynamically telling the IP addresses of other WAP-GWs to the terminal.

SUMMARY OF THE INVENTION

It is an object of the present invention to provide a feasible method and a corresponding arrangement for conveying WAP-related messages between terminals and WAP-GWs. It is an additional object of the invention that the proposed method does not require exhaustive respecification in the framework of existing standards and proposals. A further object of the invention is to minimize the required protocol overhead in the WAP-related traffic between the terminals and the WAP-GWs. An even further object of the invention is to provide means for distinguishing the WAP-related traffic from other types of packet-switched information transfer.

The objects of the invention are met by using the OSP or Octet Stream Protocol, known as such, to carry a data stream comprising the required WAP-related information.

The method according to the invention is characterized in that it comprises the steps of defining a Wireless Datagram Protocol layer as a certain layer above the octet stream protocol layer in the protocol stacks of a terminal arrangement and a network device arrangement and exchanging information related to the use of the Wireless Application Protocol between the Wireless Datagram Protocol layer in the terminal arrangement and the Wireless Datagram Protocol layer in the network device arrangement through the use of the octet stream protocol layer as well as other lower layers in the first and second protocol stacks.

The invention also applies to a terminal arrangement which is characterized in that its control entity is arranged to implement a Wireless Datagram Protocol layer in a protocol stack and exchange information related to the use of the Wireless Application Protocol between said Wireless Datagram Protocol layer in the protocol stack and a network device arrangement through the use of the octet stream protocol layer as well as other lower layers in the protocol stack.

Additionally the invention applies to a network device arrangement which is characterized in that its control entity is arranged to implement a Wireless Datagram Protocol layer in a protocol stack and exchange information related to the use of the Wireless Application Protocol between said Wireless Datagram Protocol layer in the protocol stack and a terminal arrangement through the use of the octet stream protocol layer as well as other lower layers in the protocol stack.

The Octet Stream Protocol or OSP is a previously defined way in GPRS for carrying relatively unstructured information in the form of octet streams between a mobile terminal and a GGSN. An octet is a group of eight consecutive bits. There exists a ready specified PDP Type for OSP, and in the known protocol stacks related to GPRS the OSP entity is directly on top of the SNDCP (Subnetwork Dependent Convergence Protocol) layer in the terminal and on top of the GTP (GPRS Tunneling Protocol) in the GGSN. Additionally there exists a known way for a GGSN to operate as a mediator between an OSP-carried connection in the direction of a mobile terminal and further network devices like a WAP gateway. According to the invention the WDP protocol entity will be placed on top of the OSP entity in the terminal, and on top of the OSP entity or a corresponding, mapped entity in the WAP gateway. Other protocol entities may take the role of adaptation layers therebetween if required.

A PDP Context activation procedure between a terminal and a GGSN is required to enable the transmission of WAP-related messages in the framework of OSP. The device that initiates the activation procedure transmits an Activate PDP Context Request that contains a set of parameters that are required to identify and define the desired PDP Context. In the case of terminal-initiated PDP Context activation the SGSN may need to select the appropriate GGSN on the basis of the parameters contained within the activation request and possibly using also previously stored information about the home location of the terminal. If the WAP-GW functionality is not implemented within a GGSN, a specific interface may be needed to define the transmission of information therebetween.

After the PDP Context setup has been accomplished, WAP-related messages are conveyed as an octet stream by using either the octet mode, where the OSP protocol entity applies a packet assembly/disassembly function, or the block mode where no separate packet assembling or disassembling is performed.

The invention has several advantageous features. Using OSP as the bearer for WAP makes it possible to minimize protocol overheads because OSP does not require a large amount of associated control information. The PDP Context used to convey WAP-related messages may be completely separated from all other PDP Contexts even without defining a new PDP Type, which makes it easy to define a separate charging scheme for WAP usage. No IP addresses or other addresses of an external network are required for the transmission of WAP-related messages, which decreases configuration efforts, bypasses dynamic address allocation procedures and saves the operators from assigning static external network addresses to all users wishing to use WAP. Only the terminal and the WAP-GW or GGSN must interpret the data travelling through a "transparent tunnel" between a terminal and a SGSN on one hand, between a SGSN and a GGSN on the other hand and between a GGSN and a WAP-GW on still another hand if the GGSN and the WAP-GW have been implemented separately. Contents of the tunnels are transparent to GPRS/UMTS network elements (only MS/UE and WAP proxy/gateway have to interpret the data travelling through the tunnels). This allows flexible implementation and enhancement of the WDP protocol.

The utilization of an unstructured octet stream between a terminal and a WAP-GW or GGSN enables the operators to direct the WAP-carrying PDP Contexts of desired users always to a particular WAP-GW/GGSN; for example the one residing in the user's home network. On the other hand, operators may also allow any WAP-GWs to be used, but this may restrict the service to the mobile-originated alternative only. In any case the control possibilities are much more flexible than in the IP-based prior art solutions. A terminal may even select a desired WAP-GW/GGSN by using a certain predefined parameter in an Activate PDP Context Request.

BRIEF DESCRIPTION OF DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

FIG. 1 has been already discussed above within the description of prior art.

DETAILED DESCRIPTION OF THE INVENTION

Figure 1:
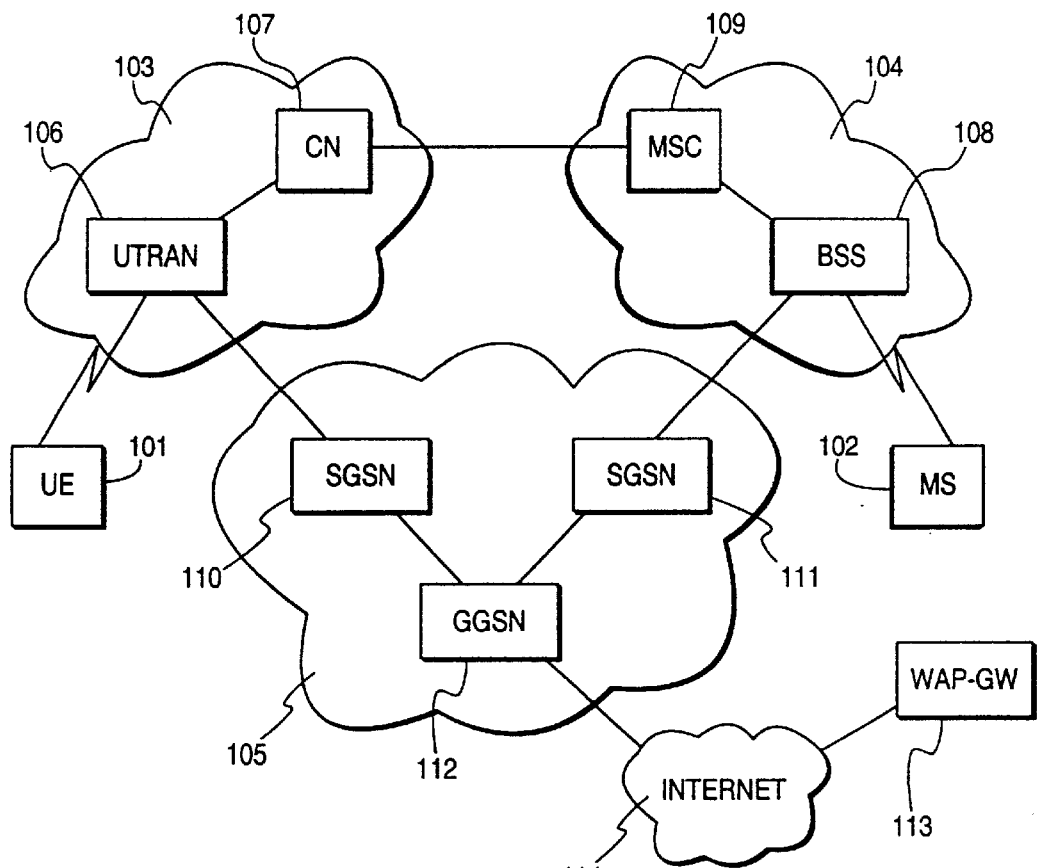
FIG. 1 illustrates some known system aspects of packet-switched data transmission.
Figure 2:
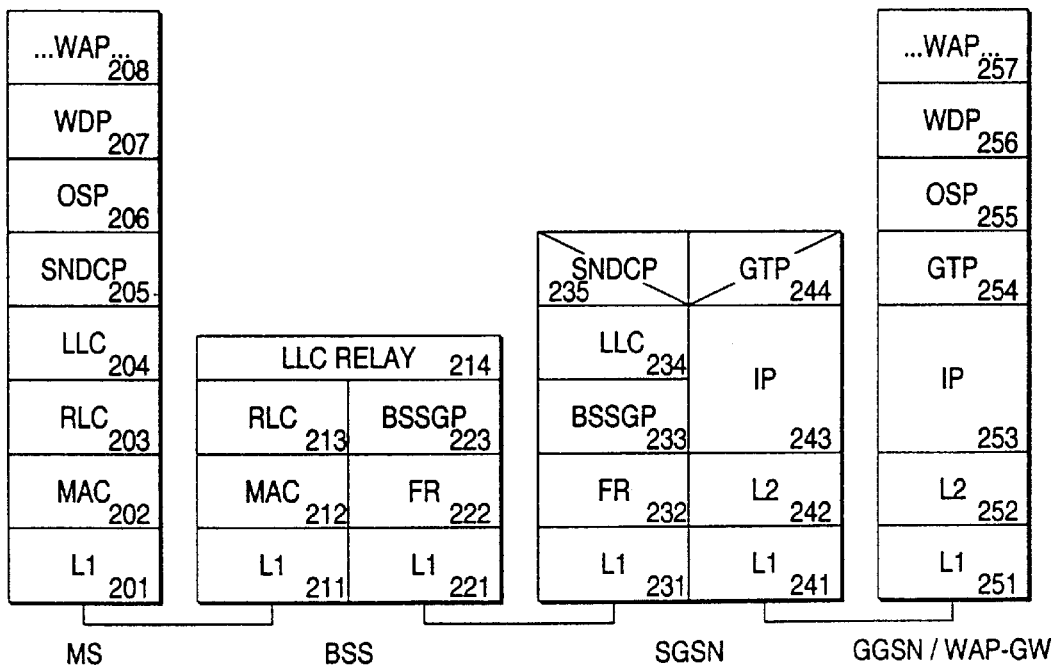
FIG. 2 illustrates an arrangement of protocol stacks according to an embodiment of the invention.

FIG. 2 illustrates an advantageous arrangement of protocol stacks in a terminal or Mobile Station (MS), an Base Station Subsystem (BSS), a Serving GPRS Support Node (SGSN) and a combined Gateway GPRS Support Node and Wireless Application Protocol Gateway (GGSN/WAP-GW). The notation refers to the application of the invention in association with an enhanced GSM network; this should not be construed as an implicit limitation to the applicability of the invention. In the context of UMTS, for example, the terminal would be designated as the UE (User Equipment) and the BSS would be substituted by one of the network devices belonging to a UTRAN, e.g. a Node B or a Radio Network Controller. Within the BSS or the UTRAN there may be a specific interface unit that takes care of all data traffic to and from such packet data networks that do not share the switching facilities (the core networks) with the cellular telephone systems.

The protocol layers related to the application of the invention in the MS are, from bottom to top, Layer 1 201, Medium Access Control 202, Radio Link Control 203, Logical Link Control 204, Subnetwork Dependent Convergence Protocol 205, Octet Stream Protocol 206, Wireless Datagram Protocol 207 and upper Wireless Application Protocol layers 208; the WAP concept encompasses a number of known alternatives for the contents of block 208 and the invention does not place any limitations to their use because all of them use the WDP layer 207 to commumncate with lower protocol layers in a protocol stack. Some sources refer to some of the layers of FIG. 2 as sublayers, which has no practical importance to the present invention. It has to be noted that the "MS" is a general notation for the apparatus or arragement of apparatuses which are operative at a terminal end: one possible "MS" arrangement is a mobile telephone or other cellular network terminal coupled to a laptop computer, whereby for example the OSP protocol layer 206 may reside in the mobile telephone and the WDP protocol layer 207 may reside in the laptop computer.

On the left-hand side of the BSS the three lowest layers 211, 212 and 213 are the same and on top of them there is LLC Relay layer 214 for performing the required conversions between the left-hand and right-hand sides of the BSS. The three right-hand layers of the BSS are, from bottom to top, Layer 1 221, Frame Relay layer 222 and BSS GPRS Protocol layer 223. In the SGSN the three lowest left-hand side layers 231, 232 and 233 are same as on the right-hand side of the BSS, and above them is the Logical Link Control layer 234 which is the peer entity of the similarly named layer in the MS. On the right-hand side of the SGSN there are the Layer 1 241, Layer 2 242 and Internet Protocol 243 layers. On top of the SGSN protocol stack there is a conversion entity consisting of an SNDCP half 235 and a GPRS Tunneling Protocol half 244. The protocol layers of the GGSN/WAP-GW are, from bottom to top, Layer 1 251, Layer 2 252, Internet Protocol 253, GPRS Tunneling Protocol 254, Octet Stream Protocol 255, Wireless Datagrarn Protocol 256 and upper Wireless Application Protocol layers 257.

Also at the GGSN/WAP-GW end there may be a division of the protocol layers to those implemented within an actual GGSN (e.g. layers 251 to 255) and those implemented within a separate WAP-GW entity (e.g. layers 256 and 257) which however is implemented "locally", meaning that another network connection through the trunk lines of the GPRS network or a similar wide-area network is not needed between the GGSN and the separate WAP-GW entity. Later we will discuss also a possibility of having the GGSN and WAP-GW entities completely separated from each other and even very remotely located.

Figure 3:
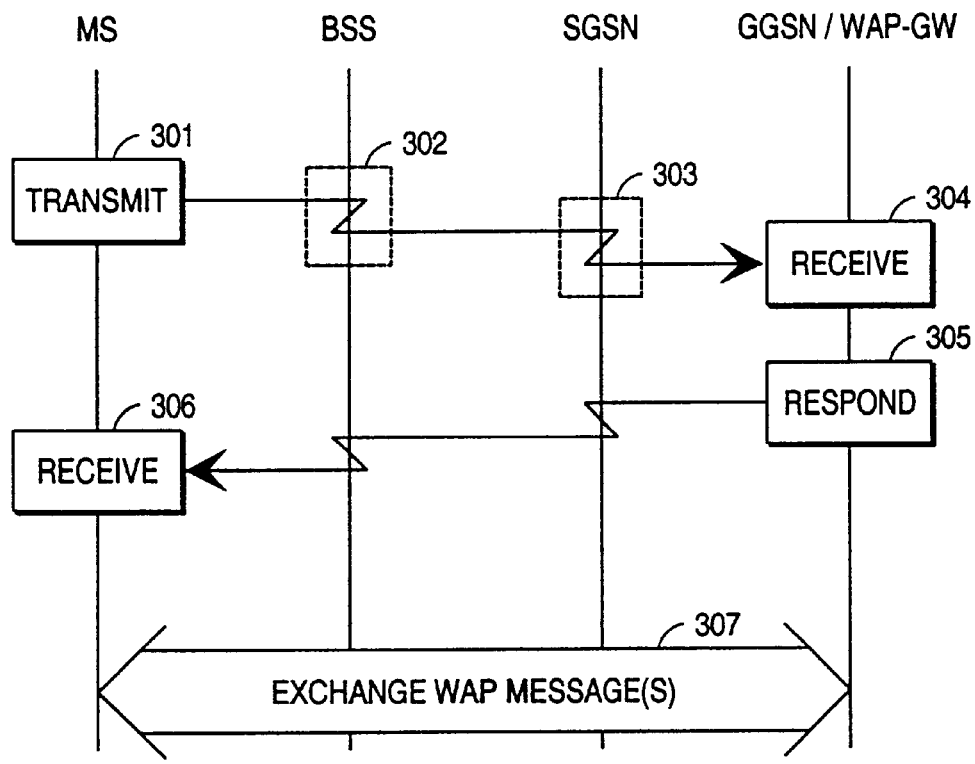
FIG. 3 is a schematic illustration of an advantageous method according to the invention.
Figure 4:
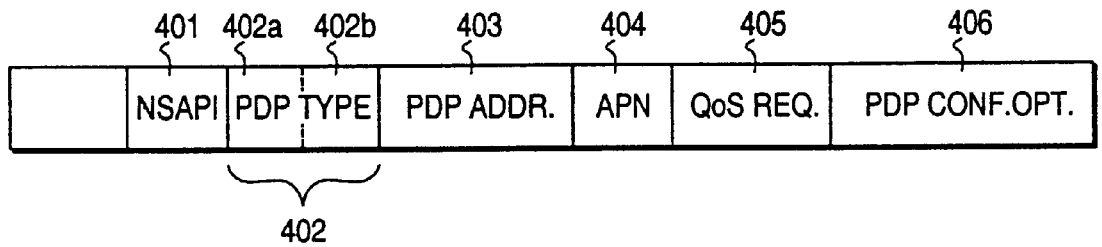
FIG. 4 is a schematic illustration of an Activate PDP Context Request used in association with the invention.

The use of the above-mentioned protocol layers in context of the present invention is explained in more detail in the following, with reference also to FIGS. 3 and 4. As an example we will use a mobile-originated procedure for enabling the exchange of WAP-related messages between a MS and a GGSN/WAP-GW. At step 301 the MS transmits an Activate PDP Context Request message in a way basically known as such. Here "basically" means that in accordance with the invention, in order to use said message to set up a PDP Context suitable for WAP-related transmission using the OSP, the MS needs to incorporate a certain set of parameters in the message. These parameters are schematically illustrated in FIG. 4 and they have the following meaning:

The Network Service Access Point Identifier or NSAPI 401 is selected by the MS. NSAPI identifies the PDP context to be activated within the GPRS/UMTS network. For identifying the user the message comprises also the TLLI (Temporary Logical Link Identity) and IMSI (International Mobile Subscriber Identity) information elements (not shown in FIG. 4). The NSAPI may be understood as a handle for the PDP Context within the MS.

The PDP Type 402 shall have a two-part value. The first part 402a shall identify the protocol as OSP, and the second part 402b shall identify the service being used and thereby allow the SGSN to select a GGSN (i.e. GGSN/WAP-GW in this case) that can provide the service. The two-part value of the PDP Type field can be expressed as OSP:WAP. This is a new OSP type that does not exist in the standards at the priority date of this patent application but introduced by this invention.

The PDP Address field 403 is most advantageously empty.

The Access Point Name or APN 404 is selected by the MS. The selected APN identifies the GGSN or GGSN/WAP-GW which the MS wants to use for this context. The actual APN to be used (i.e. GGSN or GGSN/WAP-GW to be used) can be restricted by the operator by subscription. If that is the case, the HLR (Home Location Register) record of each user for WAP-related messaging context includes the APN that is always used for WAP contexts. The MS may omit the APN from the Activate PDP Context Request message if the APN is configured in the HLR. Otherwise the user may include an APN in the message. If there is no APN in the message and no APN is configured in the HLR, the SGSN is free to choose any GGSN/WAP-GW for WAP-related messaging context (If Dynamic Allocation in the visited network is allowed by the HLR record).

The QoS Requested 405 (where QoS comes from Quality of Service) is selected by the MS. The requested service quality comprises a number of factors and their selection typically depends on the desired characteristics of the WDP. Of the known reliability classes, class 2 is seen as the most advantageous, meaning RLC&LLC retransmissions as well as the use of UDP (User Datagram Protocol) at the GPRS backbone network. Bit rates can be negotiated to be anything without the invention limiting their negotiation. Service precedence is most advantageously high if it indicates dropping precedence which results in few packet losses.

Taken that the WAP-GW is implemented "locally" with the GGSN, the PDP Configuration Options field 406 can be used e.g. for informing the WAP-GW about certain capabilities of the MS, such as supported content-types or supported ones of the alternative implementations within WAP. MS to WAP-GW configuration information can be included in this information element if these are not implemented into the WDP protocol itself. If there are many choices for the WDP protocol (either totally separate protocols or different versions of the same protocol), the PDP Configuration options can be used for informing the WAP-GW which of these the MS supports on top of OSP. We will return later to the use of the PDP Configuration Options field 406 in the case where another network connection is required between the GGSN and the WAP-GW.

At step 302 the BSS recognizes the Activate PDP Context Request message as concerning packet-switched services and consequently routes it to the current SGSN in a known way. At step 303 the SGSN selects the GGSN based on the HLR records and/or the MS-provided APN string. At step 304 the GGSN receives the message and recognizes from the context type that the new context is for WAP. If the WAP-GW functionality were not incorporated into the GGSN itself, the GGSN would additionally select an external WAP-GW element based on the APN in the context activation and the contents of the PDP Configuration Options field 406 at step 304. A proprietary interface or some standard (e.g. TCP/UDP socket interface) can in the last-mentioned case be provided between the GGSN and the WAP-GW. The GGSN/WAP-GW creates an association with the service attributes and the established tunnel (identified by TID consisting of the user's IMSI and the NSAPI value of the PDP context).

After activating the service and possibly configuring some WAP-related parameters (e.g. according to the information delivered in the Protocol Configuration Options information element), the GGSN/WAP-GW sends at step 305 a PDP Context Activation Response message via the SGSN to the MS. The reception 306 of this message at the MS finalizes the context activation. No PDP address need to be assigned for the context, although such an assignment is not precluded by the invention. After that, there is a logical tunnel in place between the MS and the GGSN/WAP-GW, where WAP-related messages can be delivered transparently as illustrated by block 307.

The activation of the PDP Context for transmitting WAP-related messages may also take place upon the initiative of the GGSN/WAP-GW. According to the adopted practice within GPRS, the MS is always the one to transmit the initial Activate PDP Context Request message, but it is possible for the GGSN/WAP-GW to indicate to the MS through a simple signalling message that there is WAP-related information waiting for delivery, so that it is left to the MS's discretion to choose the moment for activating the PDP Context by commencing the procedures illustrated in FIG. 3. In other network arrangements an GGSN/WAP-GW -originating PDP Context activation (though probably with different designations of the participating devices and associated messages) could be nearly identical to the MS-originating one described above. The identification information in the activation request would then serve to identify a particular MS instead of a SGSN-GGSN/WAP-GW combination, whereby the routing of the message could involve the known inquiries to the location registers which store the current location information of the MS.

There exists even a possibilty of allocating a fixed NSAPI to identify a PDP Context of the OSP:WAP type, whereby an explicit PDP Context activation between the MS and the GGSN/WAP-GW could be completely avoided. In such a case the occurrence of said fixed NSAPI in a packet would immediately indicate to all the devices taking part in the communication that the packet carries WAP-related information, so especially the BSS and the SGSN could arrange its routing accordingly. The INISI and the NSAPI together, as well as with possible other identification information of the packet, serve to identify the MS to which such a packet belongs. A specific APN entry would probably be required in each user's HLR records so that a SGSN would find the correct GGSN/WAP-GW for each user.

Figure 5:
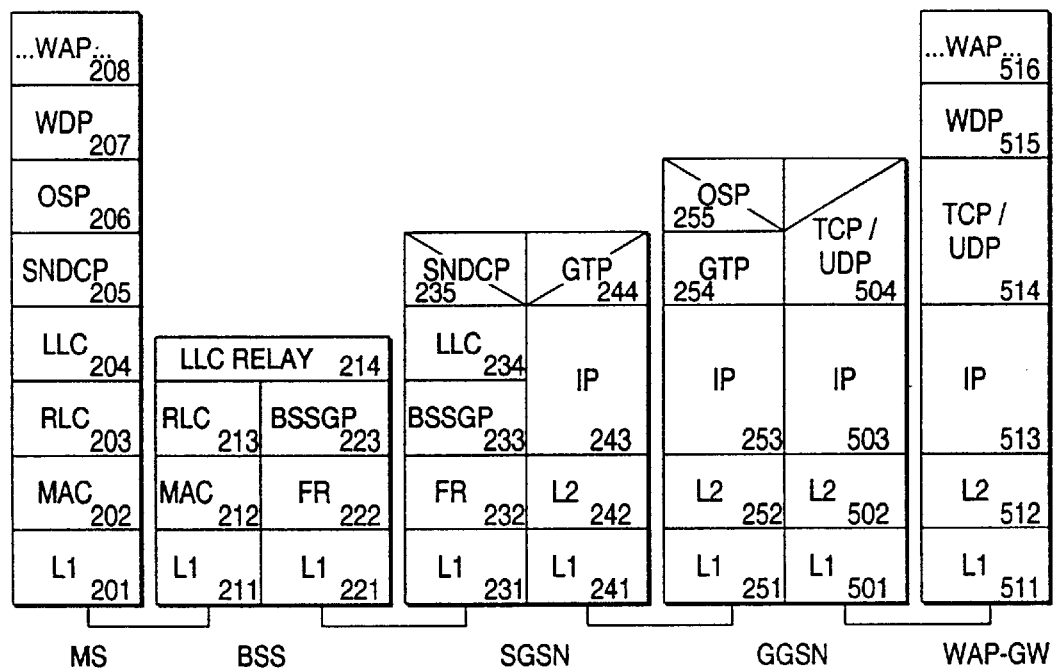
FIG. 5 illustrates an arrangement of protocol stacks according to an alternative embodiment of the invention.

FIG. 5 illustrates an alternative arrangement of protocol stacks corresponding to the situation where the GGSN and the WAP-GW are not implemented within a single device or locally. The devices taking part in the communication are the terminal or Mobile Station (MS), the Base Station Subsystem (BSS), a Serving GPRS Support Node (SGSN), a Gateway GPRS Support Node (GGSN) and the Wireless Application Protocol Gateway (WAP-GW). The same disclaimers apply to the used notation as before.

The protocol layers related to the application of the invention in the MS, the BSS and the SGSN are the same as in FIG. 2 and they are therefore marked with the same reference designators. The protocol layers on the left-hand side of the GGSN are, from bottom to top, Layer 1 251, Layer 2 252, Internet Protocol 253, GPRS Tunneling Protocol 254 and Octet Stream Protocol 255. On the right-hand side of the GGSN are the Layer 1 501, Layer 2 502 and Internet Protocol 503 layers as well as the Traffic Control Protocol/User Datagran Protocol layer 504, which in the layer hierarchy corresponds to the combined GTP ans OSP layers on the left-hand side. There is a two-way OSP-TCPIUDP conversion, known as such, implemented between the left-hand side and the right-hand side of the GGSN. The protocol layers of the WAP-GW are, from bottom to top, Layer 1 511, Layer 2 512, Internet Protocol 513, Traffic Control Protocol/User Datagram Protocol 514, Wireless Datagram Protocol 515 and upper Wireless Application Protocol layers 516.

In the arrangement of FIG. 5 the PDP Context activation procedure explained above must be slightly modified. Especially the PDP Configuration Options field of the Activate PDP Context Request message should contain at least the Internet hostname (or IP-address) of the WAP-GW, the TCP or UDP port number the WAP-GW is listening to, and the type of protocol (TCP or UDP) being used between the GGSN and the WAP-GW. Based on this information the GGSN is able to set up an IP-based communication path to the WAP-GW. This communication path is then used for delivering WDP packets between GGSN and WAP-GW. However, the GGSN does not need to understand the structure or contents of the WDP packets. Instead, the GGSN simply relays data received from the OSP layer to this IP-based communication path, and vice versa.

The arrangement of FIG. 5 is advantageous in the sense that the separate WAP-GW is easily implemented independently of the operator(s) that set up and maintain the GPRS trunk network. It is also simpler to implement a separate WAP-GW entity than a combined GGSN/WAP-GW unit. The drawback of this arrangement is the need for additional TCP or UDP protocol overhead between the GGSN and the WAP-GW. The mirror images of these advantages and drawbacks apply to the arrangement of FIG. 2: the GGSN/WAP-GW unit can not be implemented independently of the operators and the required implementation complexity is higher, but the protocol overheads are minimized.

Figure 6:
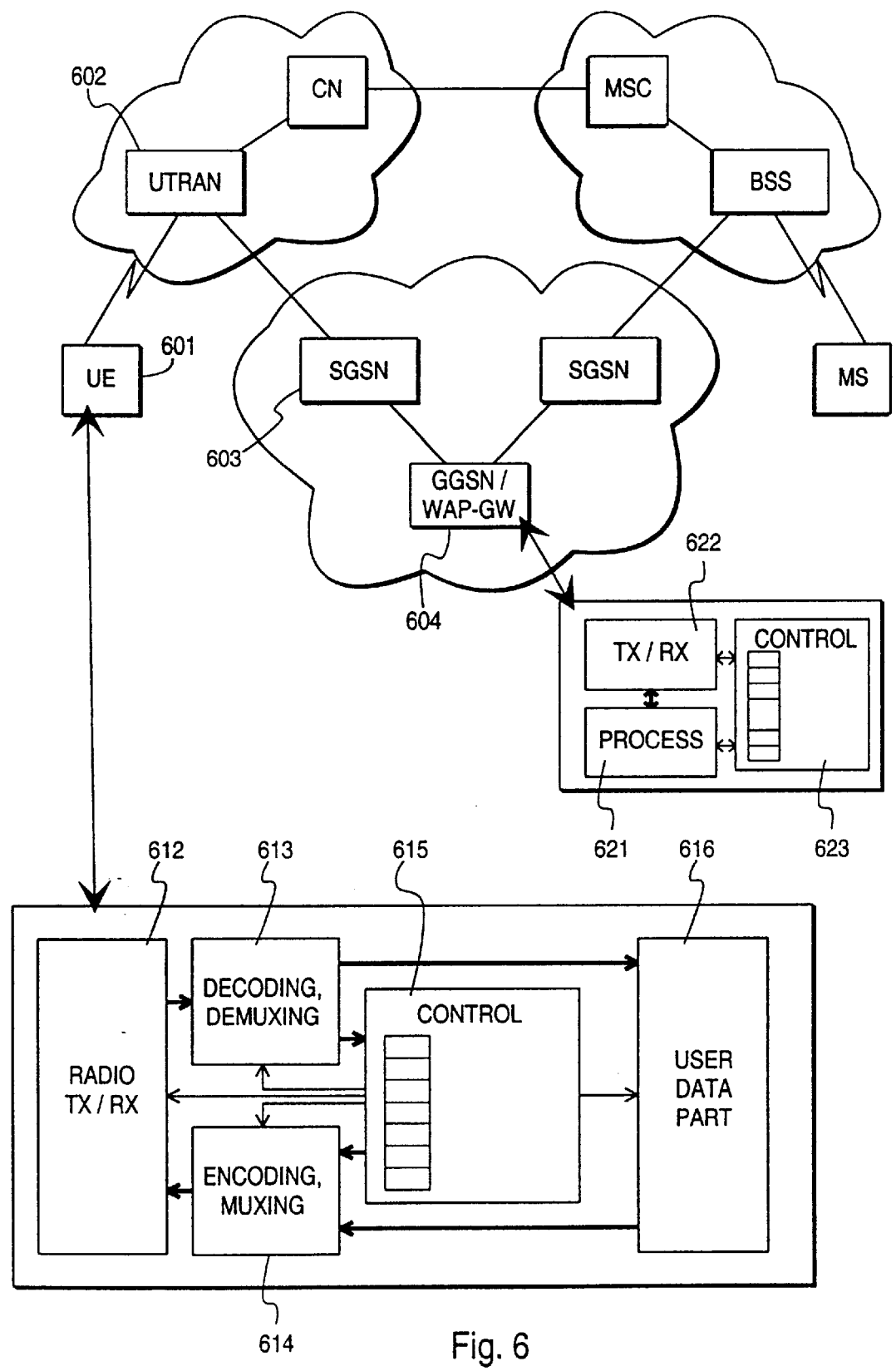
FIG. 6 illustrates schematically an arrangement according to the invention, FIG. 7 summarizes some aspects of certain protocol layers according to the invention

FIG. 6 illustrates an arrangement according to the invention comprising a terminal or MS (or UE) 601, a BSS or UTRAN 602, a SGSN 603 and a combined GGSN/WAP-GW 604. The hardware of the terminal comprises a radio transceiver block 612, a decoding/demultiplexing block 613, an encoding/multiplexing block 614, a control block 615 and a user data part 616. The decoding/demultiplexing block 613 is arranged to separate received signalling information from received user data and to direct the former into the control block 615; similarly the encoding/multiplexing block 614 is arranged to take signalling information from the control block 615 and to multiplex it for transmission with user data coming from the user data part 616. All other blocks operate under the supervision of the control block. The control connections are shown with thinner lines than the user data and signalling-information connections. The MS protocol stack seen in greater detail in FIG. 2 (or FIG. 5) is implemented within the control block 615 by programming the corresponding operations into a memory in the form of machine-readable processing instructions. If the terminal arrangement comprises a number of separate functional entities, the control block may be understood to consist of the control functions distributed into the physical controlling entities of the separate devices.

The WAP-GW is basically like any network-coupled computer device with a processing unit 621 and a transmission unit 622 arranged to couple the processing unit to the trunk lines of the GPRS network (or a corresponding packet data network). It may also comprise a control unit 623 to control the setting up, maintaining and tearing down of connections, although the control functions may be implemented as a part of the processing unit 621. The GGSN/WAP-GW protocol stack seen in greater detail in FIG. 2 is implemented within the control block 623 by programming the corresponding operations into a memory in the form of machine-readable processing instructions.

Figure 7:
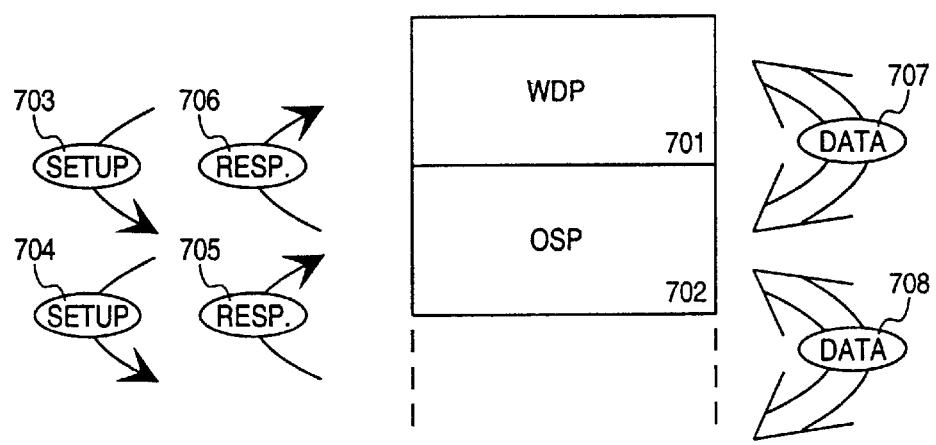

FIG. 7 summarizes the functions of the WDP, OSP and lower protocol layers in all such protocol stacks where the WDP and OSP layers are located. The WDP protocol layer 701 is arranged to indicate to the OSP layer 702 the need for setting up a OSP:WAP type PDP Context with a first primitive 703; this primitive should contain at least the APN, QoS Requested and PDP Configuration Options information elements referred to above. The OSP layer 702 is in general capable of indicating to the lower layers the need for setting up PDP Contexts, and especially capable of indicating with a setup request primitive 704 that a PDP Context of the OSP:WAP type should be requested. This second primitive 704 should contain at least the PDP Type, APN, QoS Requested and PDP Configuration Options information elements referred to above. The lower layers are in general capable of informing the OSP layer 702 about the completed activation of the PDP Context with a third primitive 705, and the OSP layer 702 is in turn capable of forwarding the same information to the WDP layer 701 in a fourth primitive 706.

During operation the WDP layer 701 is arranged to exchange user data with the OSP layer according to the arrow 707, and the OSP layer is arranged to transmit the user data to be transmitted further down in the protocol stack according to arrow 708 either in the octet mode or in the block mode. The former refers to the known use of a PAD or Packet Assembly/Disassembly function to assemble/disassemble a number of octets into/from a single packet for more effective transport by the underlying protocols. The block mode refers to the bypassing of the PAD function, whereby the WDP layer 701 provides the message data to the OSP layer 702 in blocks of octets, and each block of octets is delivered as a single OSP PDU (Protocol Data Unit) to the underlying layers. The block mode is regarded as more advantageous for use in association with the invention, because the WDP layer does the segmentation of WAP-related messages anyway and an OSP layer operating in the block mode can then pass the WDP packets through to the SNDCP layer and vice versa.

Tearing down of the OSP:WAP type PDP Context follows the known procedures of tearing down PDP Contexts.

Figure 8:
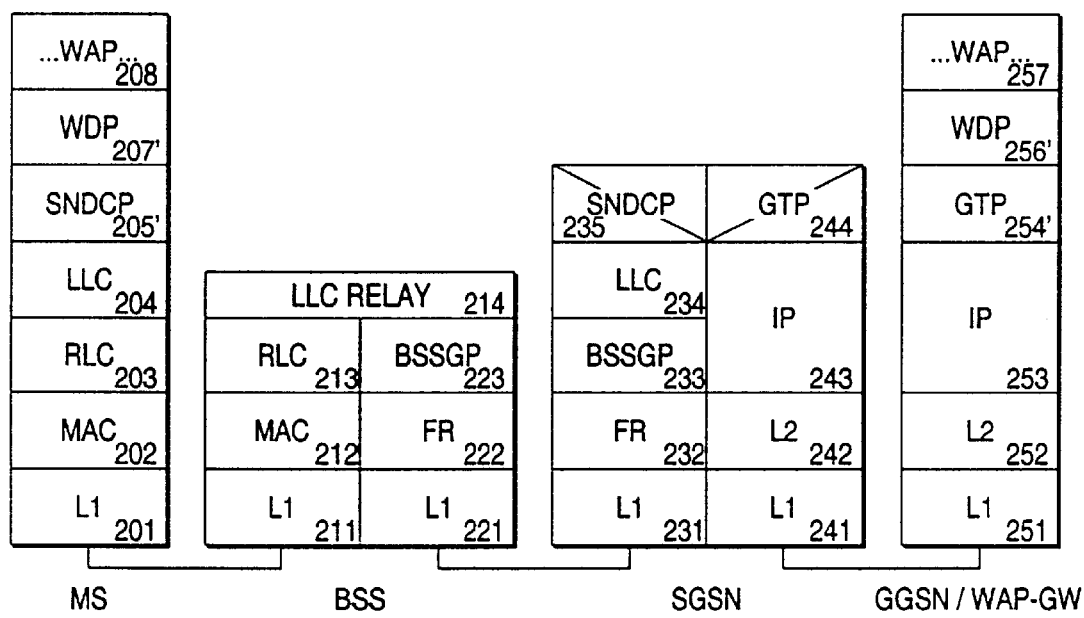
FIG. 8 illustrates a further alternative arrangement of protocol stacks.

There exists an alternative way for conveying WAP-related messages without actually using an OSP protocol layer at all. FIG. 8 illustrates the protocol stacks of a solution where a PDP Type has been separately defined for WAP use. This solution requires a PDP Context of the specific WAP type to be set up between a terminal and an WAP-GW each time a WAP-related message has to be conveyed in either direction. The SNDCP layer 205' and the WDP layer 207' in the MS are adapted for direct interfacing with each other, as are the GTP layer 254' and WDP layer 256' in the GGSN/WAP-GW. A similar adaptation is easily presented for the embodiment of FIG. 5 so that the MS protocol stack is like that in FIG. 8 and in the GGSN entity there is a top-level conversion between the GTP and TCP/UDP layers without involving an OSP layer.

The approach of using a PDP Context of a specific WAP type is very efficient in terms of minimized overheads and simplified structure of the protocol stacks, but it has the drawback of requiring a considerable amount of completely new specification and standardization work. It is known that new PDP Types are only very reluctantly accepted to the already frozen standards.

What is claimed is:

1. A method for transmitting information related to the use of the Wireless Application Protocol between a terminal arrangement and a network device arrangement coupled to a packet-switched data transmission network, comprising the steps of:

defining a first protocol stack for the terminal arrangement and a second protocol stack for the network device arrangement, the protocol stacks consisting of layers, for arranging the mutual exchange of information between the terminal arrangement and the network device arrangement, defining an octet stream protocol layer for the transmission of unstructured octet streams as a certain layer in the first protocol stack and a certain layer in the second protocol stack, defining a Wireless Datagram Protocol layer as a certain layer above the octet stream protocol layer in the first and second protocol stacks and exchanging information related to the use of the Wireless Application Protocol between the Wireless Datagram Protocol layer in the terminal arrangement and the Wireless Datagram Protocol layer in the network device arrangement through the use of the octet stream protocol layer as well as other lower layers in the first and second protocol stacks.

2. A method according to claim 1, comprising the step of defining a default PDP Context between the terminal arrangement and the network device arrangement for the exchange of information related to the use of the Wireless Application Protocol, said default PDP Context being of a specific type defined for the exchange of information related to the use of the Wireless Application Protocol and existing without explicit PDP Context activation.

3. A method according to claim 1, comprising the step of activating a PDP Context between the terminal arrangement and the network device arrangement for the exchange of information related to the use of the Wireless Application Protocol, said PDP Context being of a specific type defined for the exchange of information related to the use of the Wireless Application Protocol.

4. A method according to claim 3, wherein the activation of the PDP Context involves the transmission of an Activate PDP Context message comprising:
- a Network Service Access Point Identifier for identifying the PDP context to be activated,
- a PDP Type value for identifying the protocol as an octet stream protocol and for identifying the service being used as the transmission of information related to the use of the Wireless Application Protocol,
- an Access Point Name for identifying the intended recipient device of the Activate PDP Context message,
- a QoS Requested field for indicating the requested quality of service for the PDP context to be activated and
- a PDP Configuration Options field for carrying other information related to the PDP context to be activated.

5. A terminal arrangement for exchanging information related to the use of the Wireless Application Protocol with a network device arrangement through a packet-switched data transmission network, comprising:
- a radio transceiver block,
- a control entity,
- a user data part
- a decoding/demultiplexing block arranged to separate received signalling information from received user data and to direct the former into the control entity and
- an encoding/multiplexing block arranged to take signalling information from the control entity and to multiplex it for transmission with user data coming from the user data part;

wherein the control entity is arranged to:
- implement a protocol stack and an octet stream protocol layer for the transmission of unstructured octet streams as a certain layer in the protocol stack, for arranging the mutual exchange of information between the terminal arrangement and the network device arrangement,
- implement a Wireless Datagram Protocol layer in the protocol stack and
- exchange information related to the use of the Wireless Application Protocol between said Wireless Datagram Protocol layer in the protocol stack and the network device arrangement through the use of the octet stream protocol layer as well as other lower layers in the protocol stack.

6. A terminal arrangement according to claim 5, comprising a communication device and a presentation device coupled to said communication device, so that the control entity consists of parts distributed into said communication device and said presentation device, so that said octet stream protocol layer is implemented in said communication device and said Wireless Datagram Protocol layer is implemented in said presentation device.

7. A network device arrangement for exchanging information related to the use of the Wireless Application Protocol with a terminal arrangement through a packet-switched data transmission network, comprising:
- a transmission unit,
- a control entity and
- a processing entity;

wherein the control entity is arranged to:
- implement a protocol stack and an octet stream protocol layer for the transmission of unstructured octet streams as a certain layer in the protocol stack for arranging the mutual exchange of information between the network device arrangement and the terminal arrangement,
- implement a Wireless Datagram Protocol layer in the protocol stack and
- exchange information related to the use of the Wireless Application Protocol between said Wireless Datagram Protocol layer in the protocol stack and the terminal arrangement through the use of the octet stream protocol layer as well as other lower layers in the protocol stack.

8. A network device arrangement according to claim 7, comprising locally a node device of the packet-switched data transmission network and a Wireless Application Protocol Gateway device coupled to said node device, so that the control entity consists of parts distributed into said node device and said Wireless Application Protocol Gateway device, so that said octet stream protocol layer is implemented in said node device and said Wireless Datagram Protocol layer is implemented in said Wireless Application Protocol Gateway device.

9. A network device arrangement according to claim 7, comprising a standalone Wireless Application Protocol Gateway device coupled to a node device of the packet-switched data transmission network through a network connection.

* * * * *